US012789791B2

(12) United States Patent
Jo

(10) Patent No.: US 12,789,791 B2
(45) Date of Patent: Nov. 10, 2026

(54) METHOD FOR ESTIMATING COLLISION RISK ACCORDING TO ROAD ENVIRONMENT AND VEHICLE SYSTEM THE SAME

(71) Applicant: HL Klemove Corp., Incheon (KR)

(72) Inventor: Eunsan Jo, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 144 days.

(21) Appl. No.: 18/384,775

(22) Filed: Oct. 27, 2023

(65) Prior Publication Data

US 2024/0317216 A1 Sep. 26, 2024

(30) Foreign Application Priority Data

Mar. 23, 2023 (KR) ........................ 10-2023-0037818

(51) Int. Cl.
*B60W 30/09* (2012.01)
*B60T 7/22* (2006.01)
(Continued)

(52) U.S. Cl.
CPC ............... *B60W 30/09* (2013.01); *B60T 7/22* (2013.01); *B60W 60/0053* (2020.02); (Continued)

(58) Field of Classification Search
CPC ............. B60W 30/09; B60W 60/0053; B60W 2552/40; B60W 2554/802;
(Continued)

(56) References Cited

U.S. PATENT DOCUMENTS 10,703,373 B2 * 7/2020 Fernando ............ B60W 30/188
11,091,165 B2 * 8/2021 Schlegel .................. G06N 7/01
(Continued)

FOREIGN PATENT DOCUMENTS

JP 2002067843 A * 3/2002

OTHER PUBLICATIONS

Borgeson et al., "Sensor data fusion for road friction estimation" (2010) (Year: 2010).*
Translation of JP-2002067843-A (2002).*

*Primary Examiner* — Erin M Piateski
*Assistant Examiner* — Hajar Hassaniardekani
(74) *Attorney, Agent, or Firm* — Hauptman Ham, LLP

(57) ABSTRACT

A method for estimating a collision risk according to a road environment is provided. The method for estimating a collision risk according to a road environment may include estimating a road surface friction coefficient distribution using at least one sensor, calculating an expected deceleration amount distribution of an own vehicle according to the road environment using the estimated road surface friction coefficient distribution and an expected deceleration amount of the own vehicle, calculating a forward safety distance distribution between the own vehicle and a forward vehicle using the calculated expected deceleration amount distribution of the own vehicle, and calculating a forward collision risk according to a current distance between the own vehicle and the forward vehicle based on the calculated forward safety distance distribution.

16 Claims, 8 Drawing Sheets

(51) Int. Cl.
*B60W 60/00* (2020.01)
*G01N 19/02* (2006.01)
*G08G 1/16* (2006.01)

(52) U.S. Cl.
CPC ............... *G01N 19/02* (2013.01); *G08G 1/16* (2013.01); *B60W 2552/40* (2020.02); *B60W 2554/802* (2020.02)

(58) Field of Classification Search
CPC ..... B60W 2420/403; B60W 2420/408; B60W 2520/26; B60W 30/0953; B60W 30/0956; B60W 40/068; B60W 60/0011; B60W 30/08; B60W 40/04; B60W 50/0097; B60W 50/0098; B60W 60/0018; B60W 2520/10; B60W 2555/20; B60T 7/22; G01N 19/02; G08G 1/16
See application file for complete search history.

(56) References Cited

U.S. PATENT DOCUMENTS

| | | | | |
|---|---|---|---|---|
| 2007/0191997 | A1* | 8/2007 | Isaji | B60T 7/22 701/1 |
| 2020/0377115 | A1* | 12/2020 | Tournabien | G01S 17/86 |
| 2021/0300418 | A1* | 9/2021 | Alvarez | G08G 1/096791 |
| 2023/0119295 | A1* | 4/2023 | Nilsson | G08G 1/143 701/26 |
| 2023/0159031 | A1* | 5/2023 | Hu | B60W 40/04 701/96 |
| 2023/0234618 | A1* | 7/2023 | Ji | B60W 60/0015 701/23 |
| 2023/0256972 | A1* | 8/2023 | Roy | B60C 23/20 73/146 |
| 2023/0415647 | A1* | 12/2023 | Ravuri | B60T 7/22 |
| 2024/0061424 | A1* | 2/2024 | Kim | B60W 60/0015 |
| 2024/0351615 | A1* | 10/2024 | Song | B60W 30/18163 |
| 2025/0381955 | A1* | 12/2025 | Gacka | B60W 30/0953 |

* cited by examiner

METHOD FOR ESTIMATING COLLISION RISK ACCORDING TO ROAD ENVIRONMENT AND VEHICLE SYSTEM THE SAME

CROSS-REFERENCE TO RELATED APPLICATION

This application claims priority under 35 U.S.C. § 119 to Korean Patent Application No. 10-2023-0037818, filed on Mar. 23, 2023, in the Korean Intellectual Property Office (KIPO), the disclosure of which is incorporated by reference herein in its entirety.

TECHNICAL FIELD

The present disclosure relates to a method for estimating a collision risk of a vehicle in consideration of a road environment according to various factors such as weather and a vehicle system thereof.

BACKGROUND

Currently, an advanced driver assistance system (ADAS) technology and an autonomous driving technology for assisting driver's driving are being used. Here, ADAS is for autonomous performance of securing a safe distance between vehicles, maintaining lanes, changing and overtaking, and may represent a technology for detecting a risk of collision with forward and rear vehicles using various sensors.

However, general ADAS does not consider uncertain behaviors of surrounding vehicles according to road environments such as bad weather. In other words, in a road environment with heavy rain or heavy fog, since the road surface friction coefficient may be lowered or the driver's viewing range may be narrowed, adaptive control such as predicting a longer braking distance of surrounding vehicles is required, but typical ADAS has a problem of not considering these road environments.

SUMMARY

The present disclosure provides a method for estimating a collision risk according to a road environment and a vehicle system to solve the above problems.

The present disclosure may be implemented in a variety of ways, including a method, a system (device), and a non-transitory computer-readable medium for storing instructions.

According to an example embodiment of the present disclosure, a method for estimating a collision risk according to a road environment performed by at least one processor includes estimating a road surface friction coefficient distribution using at least one sensor, calculating an expected deceleration amount distribution of an own vehicle according to the road environment using the estimated road surface friction coefficient distribution and an expected deceleration amount of the own vehicle, calculating a forward safety distance distribution between the own vehicle and a forward vehicle using the calculated expected deceleration amount distribution of the own vehicle, and calculating a forward collision risk according to a current distance between the own vehicle and the forward vehicle based on the calculated forward safety distance distribution.

According to an example embodiment of the present disclosure, the at least one sensor includes a first sensor and a second sensor. The estimating of the road surface friction coefficient distribution using the at least one sensor includes estimating a first road surface friction coefficient distribution based on the first sensor, and estimating a second road surface friction coefficient distribution based on the second sensor.

According to an example embodiment of the present disclosure, the calculating of the expected deceleration amount distribution of the own vehicle according to the road environment using the estimated road surface friction coefficient distribution and the expected deceleration amount of the own vehicle includes calculating a first expected deceleration amount distribution according to the first road surface friction coefficient distribution, and calculating a second expected deceleration amount distribution according to the second road surface friction coefficient distribution, and calculating the expected deceleration amount distribution of the own vehicle by combining the first expected deceleration amount distribution and the second expected deceleration amount distribution based on reliability of the first sensor and the second sensor.

According to an example embodiment of the present disclosure, the calculating of the forward safety distance distribution between the own vehicle and the forward vehicle using the calculated expected deceleration amount distribution of the own vehicle includes calculating an expected deceleration distance distribution of the own vehicle using the expected deceleration amount distribution of the own vehicle, and calculating the forward safety distance distribution using a driving distance of the own vehicle during a reaction time, the expected deceleration distance distribution of the own vehicle, and a deceleration distance of the forward vehicle.

According to an example embodiment of the present disclosure, the method further includes, when the calculated forward collision risk is greater than or equal to a first threshold value, regenerating a movement trajectory by reducing a driving speed of the own vehicle.

According to an example embodiment of the present disclosure, the method further includes calculating an expected deceleration amount distribution of a rear vehicle according to the road environment using the estimated road surface friction coefficient distribution and an expected deceleration amount of the rear vehicle, calculating a rear safety distance distribution between the own vehicle and the rear vehicle using the calculated expected deceleration amount distribution of the rear vehicle, and calculating a rear collision risk according to a current distance between the own vehicle and the rear vehicle based on the calculated rear safety distance distribution.

According to an example embodiment of the present disclosure, the method further includes determining a viewing range of the rear vehicle using the at least one sensor, and calculating a reaction time distribution of the rear vehicle corresponding to the determined viewing range.

According to an example embodiment of the present disclosure, the calculating of the rear safety distance distribution between the own vehicle and the rear vehicle using the calculated expected deceleration amount distribution of the rear vehicle includes calculating the rear safety distance distribution between the own vehicle and the rear vehicle using the expected deceleration amount distribution of the rear vehicle and the reaction time distribution of the rear vehicle.

According to an example embodiment of the present disclosure, the calculating of the rear safety distance distribution between the own vehicle and the rear vehicle using the expected deceleration amount distribution of the rear vehicle and the reaction time distribution of the rear vehicle includes calculating an expected deceleration distance distribution of the rear vehicle using the expected deceleration amount distribution of the rear vehicle, calculating a driving distance of the rear vehicle during a reaction time using the reaction time distribution of the rear vehicle, and calculating the rear safety distance distribution using the driving distance of the rear vehicle during the reaction time, the expected deceleration distance distribution of the rear vehicle, and a deceleration distance of the own vehicle.

According to an example embodiment of the present disclosure, the method further includes, when the calculated rear collision risk is greater than or equal to a second threshold value, regenerating a movement trajectory by increasing a driving speed of the own vehicle.

According to an example embodiment of the present disclosure, the method further includes, when the forward collision risk is greater than or equal to a first threshold and the rear collision risk is greater than or equal to a second threshold, transferring control authority of the own vehicle to a driver of the own vehicle.

According to an example embodiment of the present disclosure, a method for estimating a collision risk according to a road environment performed by at least one processor includes estimating a road surface friction coefficient distribution using at least one sensor, calculating an expected deceleration amount distribution of a rear vehicle according to the road environment using the estimated road surface friction coefficient distribution and an expected deceleration amount of the rear vehicle, calculating a rear safety distance distribution between an own vehicle and the rear vehicle using the calculated expected deceleration amount distribution of the rear vehicle, and calculating a rear collision risk according to a current distance between the own vehicle and the rear vehicle based on the calculated rear safety distance distribution.

According to an example embodiment of the present disclosure, the method further includes determining a viewing range of the rear vehicle using the at least one sensor, and calculating a reaction time distribution of the rear vehicle corresponding to the determined viewing range.

According to an example embodiment of the present disclosure, the calculating of the rear safety distance distribution between the own vehicle and the rear vehicle using the calculated expected deceleration amount distribution of the rear vehicle includes calculating the rear safety distance distribution between the own vehicle and the rear vehicle using the expected deceleration amount distribution of the rear vehicle and the reaction time distribution of the rear vehicle.

According to an example embodiment of the present disclosure, the calculating of the rear safety distance distribution between the own vehicle and the rear vehicle using the expected deceleration amount distribution of the rear vehicle and the reaction time distribution in of the rear vehicle includes calculating an expected deceleration distance distribution of the rear vehicle using the expected deceleration amount distribution of the rear vehicle, calculating a driving distance of the rear vehicle during a reaction time using the reaction time distribution of the rear vehicle, and calculating the rear safety distance distribution using the driving distance of the rear vehicle during the reaction time, the expected deceleration distance distribution of the rear vehicle, and a deceleration distance of the own vehicle.

According to an example embodiment of the present disclosure, the method further includes, when the calculated rear collision risk is greater than or equal to a second threshold value, regenerating a movement trajectory by increasing a driving speed of the own vehicle.

A vehicle system according to an example embodiment of the present disclosure includes at least one sensor configured to collect sensing information for determining at least a part of a road surface friction coefficient and a viewing range according to a road environment, an electronic control device configured to calculate at least a part of a forward safety distance distribution between an own vehicle and a forward vehicle and a rear safety distance distribution between the own vehicle and a rear vehicle based on the sensing information obtained from the at least one sensor, and a driving unit configured to, when a movement trajectory of the own vehicle is generated by the electronic control device, drive the vehicle based on the generated movement trajectory.

According to an example embodiment of the present disclosure, the electronic control device is configured to estimate a road surface friction coefficient distribution based on the sensing information, calculate an expected deceleration amount distribution of the own vehicle according to the road environment using the estimated road surface friction coefficient distribution and an expected deceleration amount of the own vehicle, and calculate the forward safety distance distribution between the own vehicle and the forward vehicle using the calculated expected deceleration amount distribution of the own vehicle.

According to an example embodiment of the present disclosure, the electronic control device is configured to calculate a forward collision risk according to a current distance between the own vehicle and the forward vehicle based on the forward safety distance distribution.

According to an example embodiment of the present disclosure, the electronic control device is configured to, when the calculated forward collision risk is greater than or equal to a first threshold value, regenerate the movement trajectory by reducing a driving speed of the own vehicle.

In various example embodiments of the present disclosure, a vehicle system may provide various ADAS and autonomous driving functions by adaptively estimating a collision risk according to road environments and generating a trajectory for avoiding collision even in situations such as bad weather, and accordingly, stable driving may be possible regardless of external factors such as weather.

In various example embodiments of the present disclosure, when an expected deceleration amount distribution of the vehicle is calculated using a plurality of sensors, it is possible to more precisely estimate the expected deceleration amount distribution.

In various example embodiments of the present disclosure, when a reaction time distribution of the vehicle is calculated using a plurality of sensors, it is possible to more precisely estimate the reaction time distribution.

In various example embodiments of the present disclosure, it is possible to estimate the collision risk of the vehicle according to the road environments using the forward safety distance distribution and the rear safety distance distribution, and by correcting a movement trajectory based on this, it is possible to perform safe driving and/or lane change in any road environment.

Effects of the present disclosure are not limited to the above-mentioned effects, and other effects not mentioned will be clearly understood from the description of the claims to a person skilled in the art to which the present disclosure pertains (hereinafter, referred to as “a person skilled in the art”).

BRIEF DESCRIPTION OF THE DRAWINGS

Example embodiments of the present disclosure will be described with reference to the accompanying drawings described below, wherein similar reference numerals represent similar components, but are not limited thereto.

DETAILED DESCRIPTION

Figure 1:
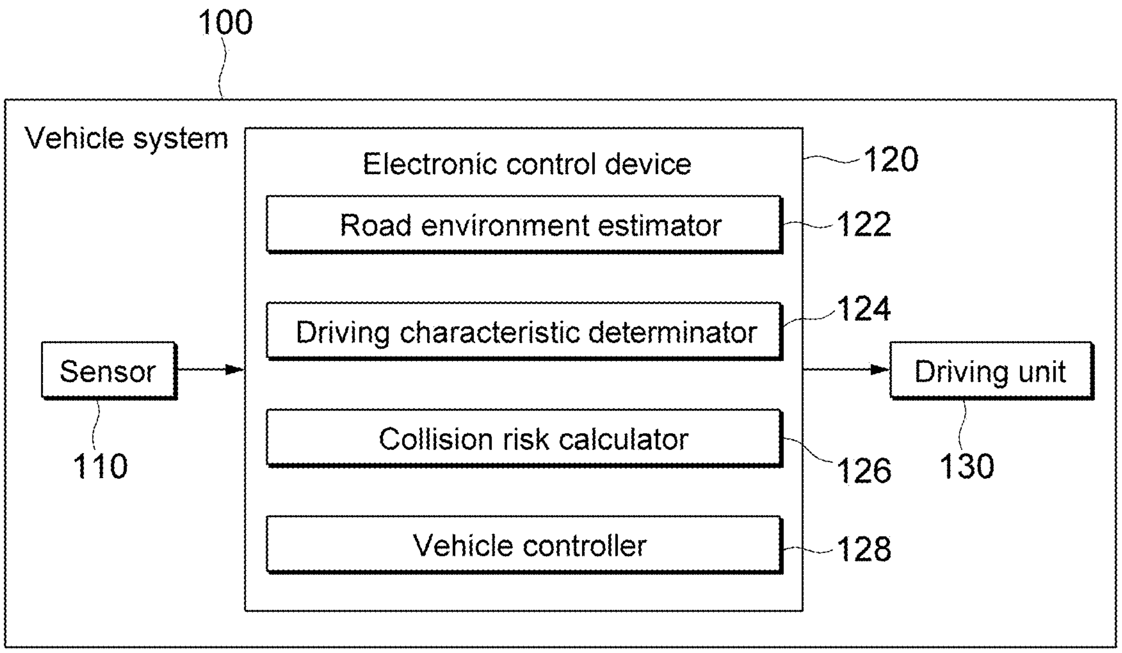
FIG. 1 is a functional block diagram illustrating an internal configuration of a vehicle system according to an example embodiment of the present disclosure.

Hereinafter, example embodiments for implementation of the present disclosure will be described in detail with reference to the accompanying drawings. However, in the following description, if there is a risk of unnecessarily obscuring the gist of the present disclosure, a specific description of a well-known function or configuration will be omitted.

In the accompanying drawings, like reference numerals refer to like components. In addition, in the description of the following example embodiments, redundant description of the same or corresponding components may be omitted. However, even if the description of the component is omitted, it is not intended that such a component is not included in any embodiment.

Advantages and features of embodiments disclosed herein, and methods for achieving them, will be clarified with reference to the example embodiments described below with the accompanying drawings. However, the present disclosure is not limited to the example embodiments disclosed below, but may be implemented in various different forms, and the example embodiments are provided merely to fully inform a person skilled in the art of the scope of the invention related to the present disclosure.

Terms used herein will be briefly described, and disclosed example embodiments will be described in detail. The terms used herein have been selected from general terms that are currently widely used as much as possible while considering the functions in the present disclosure, but they may vary according to the intention of a person skilled in the art, a precedent, or emergence of new technologies. In addition, in certain cases, some terms are arbitrarily selected by the applicant, and in this case, their meanings will be described in detail in the description of the invention. Therefore, the term used in the present disclosure should be defined based on the meaning of the term and the overall content of the present disclosure, not just the name of the term.

In the specification, singular expressions are intended to include plural expressions, unless the context clearly indicates otherwise. In addition, plural expressions include singular expressions, unless the context clearly indicates otherwise. When it is described that a part comprises a component in the entire specification, this means that the part may further include other components without excluding other components, unless specifically stated to the contrary.

In the present disclosure, the terms such as "comprise" and/or "comprising" specify the presence of stated features, steps, operations, elements, and/or components, but do not preclude the addition of one or more other features, steps, operations, elements, components, and/or combinations thereof.

In the present disclosure, when it is mentioned that one component is "coupled", "combined", or "connected" with or "reacts" to another component, the component may be directly coupled, combined, or connected with and/or react to the other component, but is not limited thereto. For example, there may be one or more intermediate components between the component and the other component. In addition, in the present disclosure, the term "and/or" may include each of one or more items listed or a combination of at least a portion of one or more items.

In the present disclosure, terms such as "first" and "second" are used to distinguish one component from another component, and the components are not limited by the terms. For example, a "first" component may be used to refer to an element of the same or similar form as a "second" component.

In the present disclosure, the term "forward vehicle" may refer to a forward vehicle of a lane in which an own vehicle is in progress and/or a forward side vehicle of the lane to which the own vehicle intends to move, and the term "rear vehicle" may refer to a rear vehicle of the lane in which the own vehicle is in progress and/or a rear side vehicle of a lane to which the own vehicle intends to move.

In the present disclosure, the term "distribution" is a probability distribution having continuous values, and may include a normal distribution determined according to the mean and standard deviation but is not limited to.

In the present disclosure, the term "expected deceleration amount" is a numerical value indicating how much deceleration occurs for a specific time period when a specific brake pressure is applied, and may refer to an expected value according to a road surface friction coefficient or the like. In addition, the expected deceleration amount of the vehicle may refer to a numerical value in the estimated road surface friction coefficient according to the type of vehicle (e.g., bus, truck, passenger car, etc.).

In the present disclosure, the term "own vehicle" is a vehicle that is a criterion for collision risk estimation and movement trajectory creation, and may indicate a vehicle that is controlled by advanced driver assistance systems (ADAS) or performs autonomous driving.

In the present disclosure, the term "safety distance" may indicate a distance in which a collision does not occur when the rear vehicle appropriately decelerates after a reaction time even if the forward vehicle rapidly decelerates. For example, a forward safety distance may be a distance in which a collision between the own vehicle and the forward vehicle does not occur when the forward vehicle rapidly decelerates, and a rear safety distance may be a distance in which a collision between the own vehicle and the rear vehicle does not occur when the own vehicle rapidly decelerates.

FIG. 1 is a functional block diagram illustrating an internal configuration of a vehicle system 100 according to an example embodiment of the present disclosure. As shown, the vehicle system 100 refers to any system for controlling or driving a vehicle, and may include a sensor 110, an electronic control device 120, and a driving unit 130, but is not limited thereto. In addition, the electronic control device 120 is illustrated as including a road environment estimator 122, a driving characteristic determinator 124, a collision risk calculator 126, and a vehicle controller 128, but is not limited thereto.

In order to estimate a collision risk according to the road environment and generate a movement trajectory, the vehicle system 100 may include at least one sensor 110 configured to collect sensing information for determining at least a part of a road surface friction coefficient and a viewing range according to a road environment, an electronic control device 120 configured to calculate at least a part of a forward safety distance distribution between an own vehicle and a forward vehicle and a rear safety distance distribution between the own vehicle and a rear vehicle based on sensing information obtained from the at least one sensor 110, and a driving unit 130 configured to, when a movement trajectory of the own vehicle is generated by the electronic control device 120, drive a vehicle based on the generated movement trajectory.

According to an example embodiment, the vehicle system 100 may estimate a collision risk with a forward vehicle and/or a rear vehicle and generate an appropriate movement trajectory even in bad weather such as rain or fog. To this end, the vehicle system 100 may estimate the road surface friction coefficient distribution by providing the sensing information obtained from the at least one sensor 110 to the electronic control device 120. In other words, the road environment estimator 122 of the electronic control device 120 may accurately estimate the road surface friction coefficient distribution determined differently in bad weather conditions or the like using at least one sensor 110.

To estimate the road surface friction coefficient distribution, the vehicle system 100 may use various sensors. For example, the vehicle system 100 may estimate the road surface friction coefficient distribution using a rain sensor or measure the tire slip rate to estimate the road surface friction coefficient distribution. Additionally or alternatively, the vehicle system 100 may estimate the road surface friction coefficient distribution using a wiper speed sensor, a camera illuminance sensor, or the like, or by measuring LiDAR reflection intensity. In other words, the road environment estimator 122 may estimate the road surface friction coefficient by obtaining at least one sensing information from among whether or not it rains, tire slip rate, wiper speed, camera illuminance, and LiDAR reflection intensity from at least one sensor 110.

According to an example embodiment, the vehicle system 100 may estimate a reaction time distribution by providing sensing information obtained from at least one sensor 110 to the electronic control device 120. In other words, the road environment estimator 122 of the electronic control device 120 may use at least one sensor 110 to estimate the viewing range of the own vehicle and/or the rear vehicle, which is determined differently in bad weather conditions and the like.

In order to estimate the viewing range, the vehicle system 100 may use various sensors. For example, the vehicle system 100 may determine the viewing range of the road using an illuminance sensor, camera illuminance, or the like, or may determine the viewing range of the road based on whether a light switch such as a fog lamp or an upward lamp is turned on/off. In other words, the road environment estimator 122 may determine the viewing range of the road by obtaining at least one sensing information of the road illuminance and whether the light switch is controlled from at least one sensor 110.

As such, after analyzing the road environment such as the road surface friction coefficient distribution and/or the viewing range, the driving characteristic determinator 124 may estimate the expected deceleration amount and/or reaction time of the vehicle in the corresponding road environment. According to an example embodiment, the driving characteristic determinator 124 may calculate the expected deceleration amount distribution of the vehicle according to the road environment using the estimated road surface friction coefficient distribution and the expected deceleration amount of the vehicle. For example, the driving characteristic determinator 124 may calculate the expected deceleration amount distribution of the vehicle by multiplying the estimated road surface friction coefficient distribution of the vehicle by the expected deceleration amount predetermined according to the vehicle type.

According to an example embodiment, the driving characteristic determinator 124 may calculate the reaction time distribution corresponding to the estimated viewing range. For example, the reaction time distribution according to the viewing range value may be predetermined, and the driving characteristic determinator 124 may, when the viewing range value is provided, calculate the reaction time distribution based on it.

According to an example embodiment, the driving characteristic determinator 124 may calculate the safety distance distribution between the vehicle and the forward vehicle or the rear vehicle using the calculated expected deceleration amount distribution and/or reaction time distribution of the vehicle. In order to calculate the safety distance distribution with the forward vehicle, the driving characteristic determinator 124 may calculate the expected deceleration distance distribution of the own vehicle using the expected deceleration amount distribution of the own vehicle, and calculate the forward safety distance distribution using the driving distance of the own vehicle during the reaction time, the expected deceleration distance distribution of the own vehicle, and the deceleration distance of the forward vehicle.

In addition, in order to calculate the safety distance distribution with the rear vehicle, the driving characteristic determinator 124 may calculate the expected deceleration distance distribution of the rear vehicle using the expected deceleration amount distribution of the rear vehicle, and calculate the driving distance of the rear vehicle during the reaction time using the reaction time distribution of the rear vehicle. Then, the driving characteristic determinator 124 may calculate the rear safety distance distribution using the driving distance of the rear vehicle during the reaction time, the expected deceleration distance distribution of the rear vehicle, and the deceleration distance of the own vehicle.

According to an example embodiment, the collision risk calculator 126 of the electronic device 120 may calculate the collision risk according to the current distance between the own vehicle and the forward vehicle and/or the rear vehicle based on the calculated forward safety distance distribution and/or rear safety distance distribution. In other words, the collision risk calculator 126 may calculate the collision risk according to the current distance between vehicles based on the safety distance distribution. For example, the collision risk may be calculated as a ratio of an area corresponding to the current distance value between vehicles to a total area in the safety distance distribution.

Then, the vehicle controller 128 may generate or regenerate the movement trajectory of the own vehicle based on the collision risk calculated by the collision risk calculator 126. For example, when the calculated forward collision risk is greater than or equal to a first threshold value, the vehicle controller 128 may regenerate the movement trajectory by reducing the driving speed (longitudinal speed) of the vehicle. In another example, when the calculated rear collision risk is greater than or equal to a second threshold value, the vehicle controller 128 may regenerate the movement trajectory by increasing the driving speed of the vehicle. Additionally, when the forward collision risk is greater than or equal to the first threshold value and the rear collision risk is greater than or equal to the second threshold value, the vehicle controller 128 may stop ADAS control and/or autonomous driving control and transfer control authority of the vehicle to the driver of the vehicle. As such, when a movement trajectory is generated or regenerated by the vehicle controller 128, the driving unit 130 may drive the vehicle based on the generated or regenerated movement trajectory.

Although each functional component included in the vehicle system 100 has been separately described in FIG. 1, this is only to help understanding of the present disclosure, and two or more functions may be performed in one arithmetic device. With this configuration, the vehicle system 100 may provide various ADAS and autonomous driving functions by estimating the collision risk adaptively to the road environment and generating a trajectory for avoiding the collision even in bad weather conditions, and accordingly, stable driving may be possible regardless of external factors such as weather.

Figure 2:
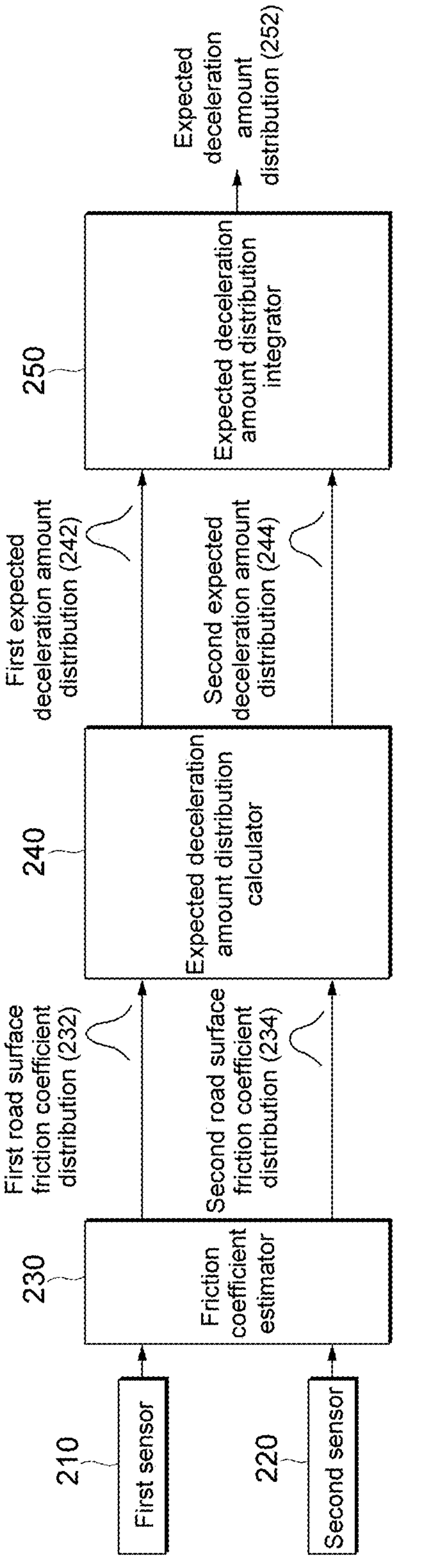
FIG. 2 is a block diagram illustrating an example of calculating an expected deceleration amount distribution using a plurality of sensors according to an example embodiment of the present disclosure.

FIG. 2 is a block diagram illustrating an example of calculating an expected deceleration amount distribution 252 using a plurality of sensors (210 and 220) according to an example embodiment of the present disclosure. As described above, the first sensor 210 and the second sensor 220 may include a rain sensor, a tire slip rate sensor, a wiper speed sensor, a camera illuminance sensor, etc., for estimating the road surface friction coefficient, but is not limited thereto, and may further include an arbitrary sensor that may be used to estimate the road surface friction coefficient. In addition, a friction coefficient estimator 230, an expected deceleration amount distribution calculator 240, and an expected deceleration amount distribution integrator 250 may be divisions of the configuration of the electronic control device (120 of FIG. 1) described above into more detailed functional configurations.

According to an example embodiment, sensing information obtained from the first sensor 210 and the second sensor 220 may be provided to the friction coefficient estimator 230. In this case, the friction coefficient estimator 230 may estimate the first road surface friction coefficient distribution 232 based on the sensing information obtained from the first sensor 210, and estimate the second road surface friction coefficient distribution 234 based on the sensing information obtained from the second sensor 220. In other words, the friction coefficient estimator 230 may estimate a separate road surface friction coefficient distribution for each sensor.

Then, the expected deceleration amount distribution calculator 240 may calculate a first expected deceleration amount distribution 242 according to the first road surface friction coefficient distribution 232, and calculate the second expected deceleration amount distribution 244 according to the second road surface friction coefficient distribution 234. For example, the expected deceleration amount distribution calculator 240 may calculate the first expected deceleration amount distribution 242 and the second expected deceleration amount distribution 244 by multiplying each road surface friction coefficient by the expected deceleration amount of the vehicle according to the type of vehicle. In other words, since the weight of a vehicle is different depending on the vehicle type, and the deceleration amount may be different depending on the vehicle type even on a road surface having a specific friction coefficient, the expected deceleration amount distribution calculator 240 may calculate the expected deceleration amount distribution in consideration of the vehicle type.

The expected deceleration amount distribution integrator 250 may calculate the expected deceleration amount distribution 252 of the vehicle by combining the first expected deceleration amount distribution 242 and the second expected deceleration amount distribution 244 based on the reliability of the first sensor 210 and the second sensor 220. Here, the reliability indicates the accuracy of the sensor and may be a predetermined value according to the type of each sensor. In other words, the expected deceleration amount distribution integrator 250 may weight-sum the plurality of expected deceleration amount distributions according to the reliability of each sensor to calculate the final expected deceleration amount distribution 252 of the vehicle.

In FIG. 2, it is shown that the expected deceleration amount distribution 252 of the vehicle is calculated using two sensors, the first sensor 210 and the second sensor 220, but is not limited thereto, and three or more different sensors may be used. With this configuration, when the expected deceleration amount distribution 252 of the vehicle is calculated using the plurality of sensors, it is possible to estimate the expected deceleration amount distribution 252 more precisely.

Figure 3:
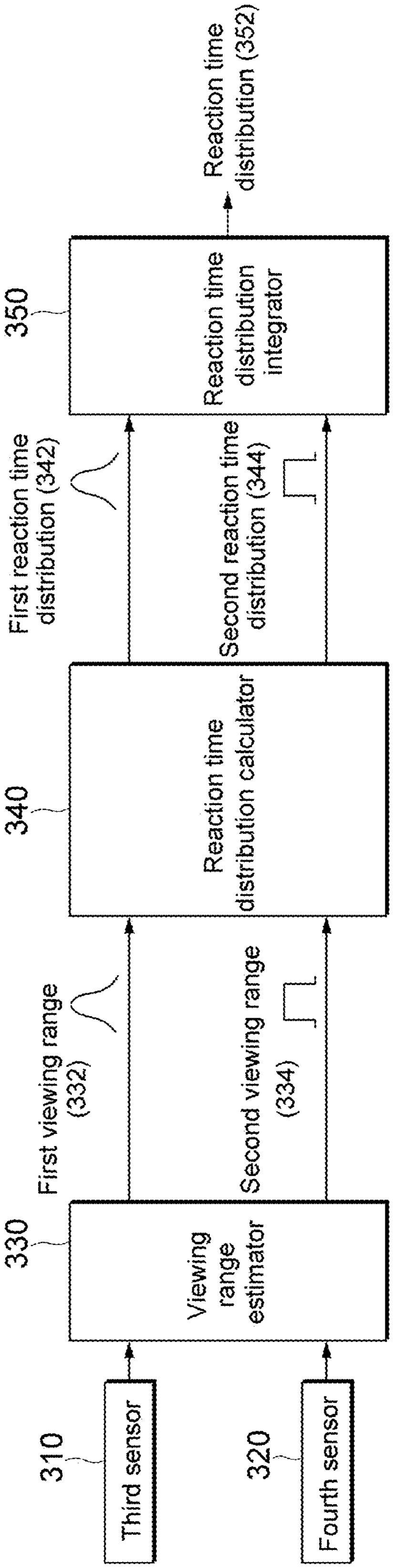
FIG. 3 is a block diagram illustrating an example of calculating a reaction time distribution using a plurality of sensors according to an example embodiment of the present disclosure.

FIG. 3 is a block diagram illustrating an example of calculating a reaction time distribution 352 using a plurality of sensors 310, 320 according to an example embodiment of the present disclosure. As described above, the third sensor 310 and the fourth sensor 320 may include an illuminance sensor or a light switch sensor for estimating the viewing range and/or reaction time, but is not limited thereto, and may further include an arbitrary sensor that may be used to estimate the viewing range. In addition, a viewing range estimator 330, a reaction time distribution calculator 340 and a reaction time distribution integrator 350 may be divisions of the configuration of the electronic control device (120 of FIG. 1) described above into more detailed functional configurations.

According to an example embodiment, sensing information obtained from the third sensor 310 and the fourth sensor 320 may be provided to the viewing range estimator 330. In this case, the viewing range estimator 330 may estimate a first viewing range 332 based on sensing information obtained from the third sensor 310, and estimate a second viewing range 334 based on sensing information obtained from the fourth sensor 320. In other words, the viewing range estimator 330 may estimate a separate viewing range for each sensor.

Then, the reaction time distribution calculator 340 may calculate a first reaction time distribution 342 according to the first viewing range 332, and calculate a second reaction time distribution 344 according to the second viewing range

334. For example, the reaction time corresponding to the measured viewing range may be matched in advance and managed, and the reaction time distribution calculator 340 may calculate the reaction time distribution based on predetermined information.

The reaction time distribution integrator 350 may calculate the reaction time distribution 352 of the vehicle by combining the first reaction time distribution 342 and the second reaction time distribution 344 based on the reliability of the third sensor 310 and the fourth sensor 320. In other words, the reaction time distribution integrator 350 may weight-sum the plurality of reaction time distributions according to the reliability of each sensor to calculate the final reaction time distribution 352 of the vehicle. The reaction time distribution 352 calculated in this way may be used to estimate the reaction time of the rear vehicle. In other words, since the set value may be used for the reaction time of the own vehicle when the own vehicle is controlled by ADAS or autonomous driving, the calculated reaction time distribution 352 is used to estimate the reaction time of the rear vehicle and may be used when calculating the rear safety distance distribution.

In FIG. 3, it is shown that the reaction time distribution 352 of the vehicle is calculated using two sensors, the third sensor 310 and the fourth sensor 320, but is not limited thereto, and three or more different sensors may be used. With this configuration, when the reaction time distribution 352 of the vehicle is calculated using the plurality of sensors, it is possible to estimate the reaction time distribution 352 more precisely.

Figure 4:
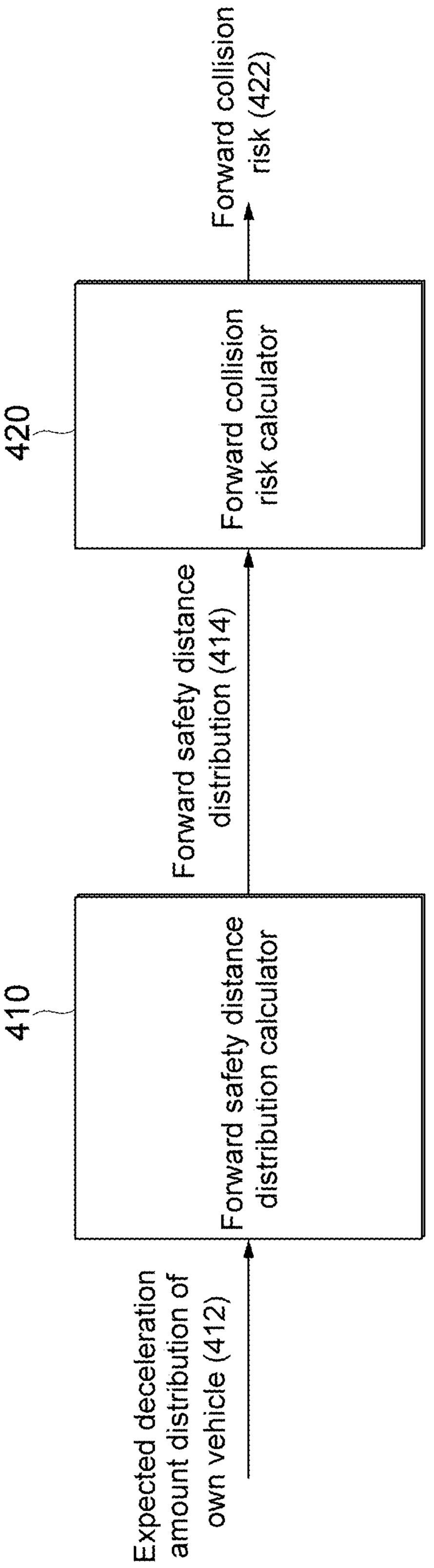
FIG. 4 is an exemplary block diagram in which a forward collision risk is calculated according to an example embodiment of the present disclosure.

FIG. 4 is an exemplary block diagram in which a forward collision risk 422 is calculated according to an example embodiment of the present disclosure. In the illustrated example, the forward safety distance distribution calculator 410 and the forward collision risk calculator 420 may be divisions of the configuration of the electronic control device (120 of FIG. 1) described above into more detailed functional configurations.

According to an example embodiment, an expected deceleration amount distribution of the own vehicle 412 may be calculated, and the expected deceleration amount distribution of the own vehicle 412 calculated as described above may be provided to the forward safety distance distribution calculator 410. In this case, the forward safety distance distribution calculator 410 may calculate the expected deceleration distance distribution of the own vehicle using the expected deceleration amount distribution of the own vehicle, and the forward safety distance distribution 414 may be calculated using the driving distance of the own vehicle during the reaction time, the expected deceleration distance distribution of the own vehicle, and the deceleration distance of the forward vehicle. For example, the forward safety distance distribution 414 may be calculated by Formula 1 below.

$$v_{ego} \times p_{ego} + \frac{v_{ego}^2}{2a_{ego}} - \frac{v_{target}^2}{2a_{target}} \qquad \text{[Formula 1]}$$

Here, $v_{ego}$ may refer to the measured current driving speed of the own vehicle, and $p_{ego}$ may refer to the set reaction time of the own vehicle. In addition, $a_{ego}$ may refer to the expected deceleration amount distribution of the own vehicle 412, $v_{target}$ may refer to the measured current driving speed of the forward vehicle, and $a_{target}$ may refer to the set deceleration amount of the forward vehicle. In other words, in Formula 1, $v_{ego} \times p_{ego}$ may be the driving distance of the own vehicle representing the moving distance during the reaction time, $$\frac{v_{ego}^2}{2a_{ego}}$$

may be the expected deceleration distance distribution of the own vehicle after the reaction time, and $$\frac{v_{target}^2}{2a_{target}}$$

may be the deceleration distance of the forward vehicle.

The forward safety distance distribution 414 calculated in this way may be provided to the forward collision risk calculator 420, and the forward collision risk calculator 420 may calculate the forward collision risk 422 based on the forward safety distance distribution 414. Here, the forward collision risk calculator 420 may calculate the forward collision risk 422 based on the current distance between the own vehicle and the forward vehicle. For example, if the forward safety distance distribution 414 is a normal distribution with a mean of 10 m and a variance of a specific value, and the current distance between the own vehicle and the forward vehicle is 10 m, the forward collision risk calculator 420 may calculate the forward collision risk 422 as 50%. When the calculated forward collision risk 422 is greater than or equal to the threshold value, the movement trajectory of the own vehicle may be regenerated by reducing the longitudinal speed so as to avoid a collision.

Figure 5:
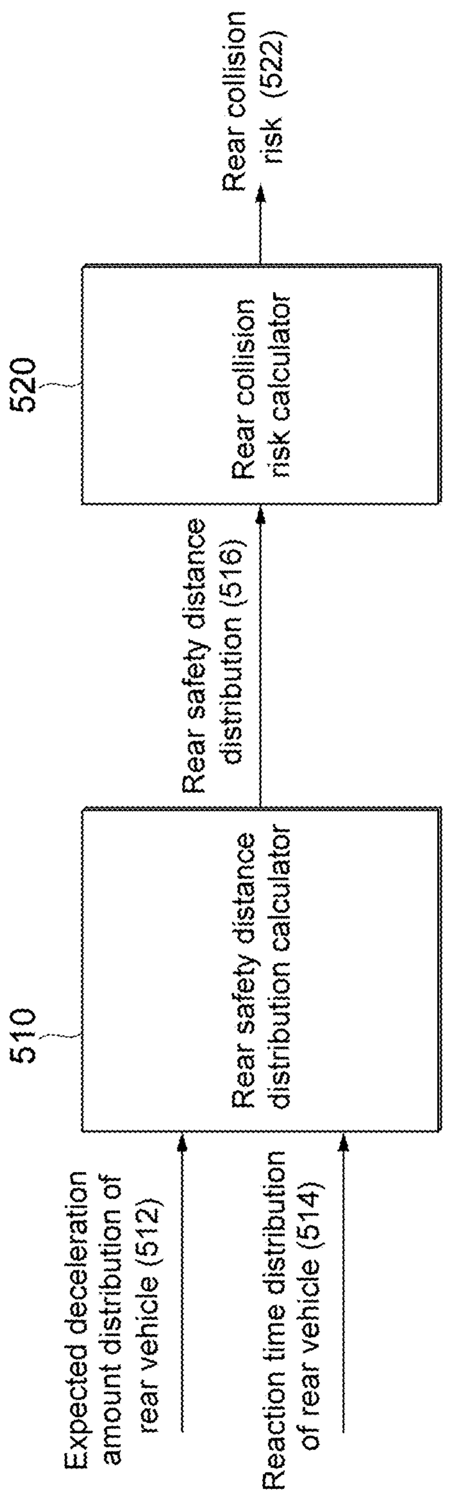
FIG. 5 is an exemplary block diagram in which a rear collision risk is calculated according to an example embodiment of the present disclosure.

FIG. 5 is an exemplary block diagram in which a rear collision risk 522 is calculated according to an example embodiment of the present disclosure. In the illustrated example, the rear safety distance distribution calculator 510 and the rear collision risk calculator 520 may be divisions of the configuration of the electronic control device (120 of FIG. 1) described above into more detailed functional configurations.

According to an example embodiment, an expected deceleration amount distribution of the rear vehicle 512 and a reaction time distribution of the rear vehicle 514 may be calculated, and the expected deceleration amount distribution of the rear vehicle 512 and the reaction time distribution of the rear vehicle 514 calculated as described above may be provided to the rear safety distance distribution calculator 510. In this case, the rear safety distance distribution calculator 510 may calculate the expected deceleration distance distribution of the rear vehicle using the expected deceleration amount distribution of the rear vehicle 512, and calculate the driving distance of the rear vehicle during the reaction time using the reaction time distribution of the rear vehicle 514. Then the rear safety distance distribution calculator 510 may calculate the rear safety distance distribution 516 using the driving distance of the rear vehicle during the reaction time, the expected deceleration distance distribution of the rear vehicle, and the deceleration distance of the own vehicle. For example, the rear safety distance distribution 516 may be calculated by Formula 2 below.

$$v_{target} \times p_{target} + \frac{v_{target}^2}{2a_{target}} - \frac{v_{ego}^2}{2a_{ego}} \qquad \text{[Formula 2]}$$

Here, $v_{targer}$ may refer to the measured current driving speed of the rear vehicle, and $p_{target}$ may refer to the reaction time distribution of the rear vehicle 514. In addition, $a_{target}$ may refer to the expected deceleration amount distribution of the rear vehicle 512, $v_{ego}$ may refer to the measured current driving speed of the own vehicle, and $a_{ego}$ may refer to the set deceleration amount of the own vehicle. In other words, in Formula 2, $v_{target} \times p_{target}$ may refer to the driving distance of the rear vehicle during the reaction time, $$\frac{v_{target}^2}{2a_{target}}$$

may refer to the expected deceleration distance distribution of the rear vehicle after the reaction time, and $$\frac{v_{ego}^2}{2a_{ego}}$$

may refer to the deceleration distance of the own vehicle.

The rear safety distance distribution 516 calculated in this way may be provided to the rear collision risk calculator 520, and the rear collision risk calculator 520 may calculate the rear collision risk 522 based on the rear safety distance distribution 516. Here, the rear collision risk calculator 520 may calculate the rear collision risk 522 based on the current distance between the own vehicle and the rear vehicle. For example, if the rear safety distance distribution 516 is a normal distribution with a mean of 10 m and a variance of a specific value, and the current distance between the own vehicle and the rear vehicle is 10 m, the rear collision risk calculator 520 may calculate the rear collision risk 522 as 50%. When the calculated rear collision risk 522 is greater than or equal to the threshold value, the movement trajectory of the own vehicle may be regenerated by increasing the longitudinal speed so as to avoid a collision. Additionally or alternatively, when the own vehicle changes lanes, the movement trajectory may be regenerated by reducing the lateral speed in order to secure the reaction time of the rear vehicle.

With such a configuration, using the forward safety distance distribution (422 in FIG. 4) and the rear safety distance distribution 516, the collision risk of the vehicle according to the road environment is estimated, and by correcting the movement trajectory based on this, safe driving and/or lane change may be performed in any road environment.

Figure 6:
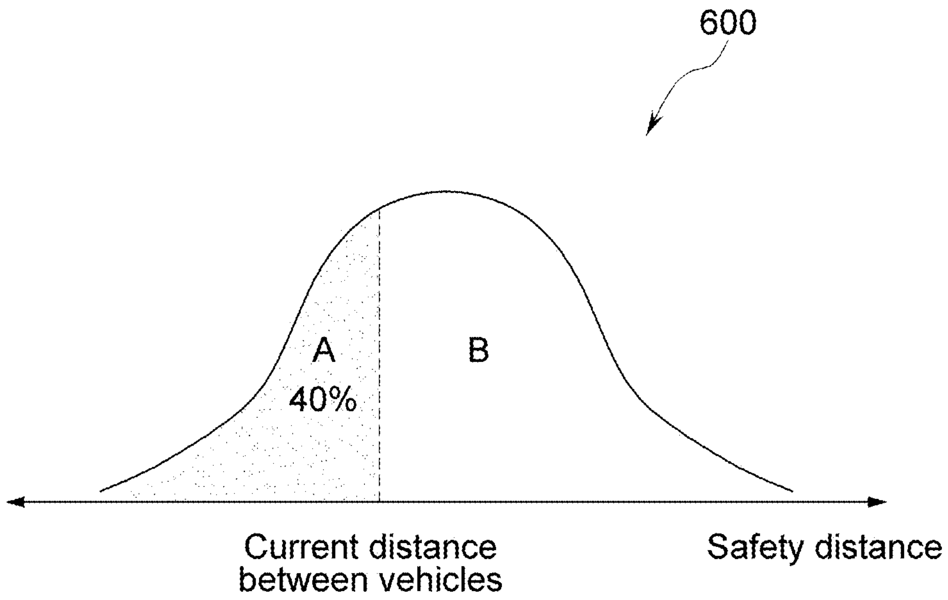
FIG. 6 is an exemplary graph illustrating a safety distance distribution according to an example embodiment of the present disclosure.

FIG. 6 is an exemplary graph illustrating a safety distance distribution 600 according to an example embodiment of the present disclosure. As shown, the safety distance distribution 600 is a probability distribution having continuous values, and may have a normal distribution form determined according to the mean and standard deviation. Depending on the safety distance distribution 600, the collision risk according to the distance between the vehicle and another vehicle may be calculated.

According to an example embodiment, the collision risk may be calculated as an area (area A) of a graph having a distance equal to or greater than the distance between vehicles compared to an area (area A+B) of the entire graph representing the safety distance distribution 600. For example, if the safety distance distribution 600 is a normal distribution with a mean of 10 m and a variance of a specific value, and the current distance between the vehicle and the other vehicle is 12 m, the collision risk may be calculated as 40%.

Figure 7:
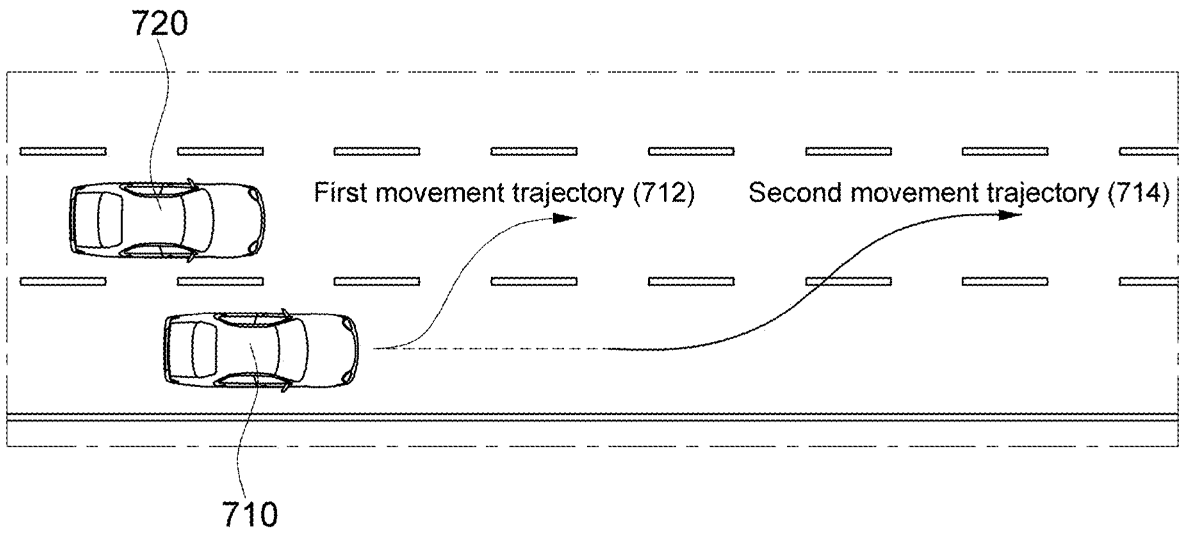
FIG. 7 is a diagram illustrating an example of regenerating a movement trajectory of an own vehicle according to an example embodiment of the present disclosure.

FIG. 7 is a diagram illustrating an example of regenerating a movement trajectory of an own vehicle 710 according to an example embodiment of the present disclosure. According to an example embodiment, the vehicle system (e.g., 100 in FIG. 1) associated with the own vehicle 710 may calculate driving characteristics (e.g., expected deceleration amount, reaction time, etc.) of the own vehicle 710 and the surrounding vehicle 720 according to the road environment, such as a road surface friction coefficient and a viewing range. In this case, the vehicle system may determine the first movement trajectory 712 according to the driving characteristics and drive based thereon. For example, the first movement trajectory 712 may be a movement trajectory in a general situation.

According to an example embodiment, the vehicle system may calculate the collision risk with the surrounding vehicle 720. Then, when it is determined that the collision risk is greater than or equal to a predetermined threshold value, the vehicle system may determine a second movement trajectory 714 by regenerating and/or modifying the movement trajectory and drive based thereon. For example, the second movement trajectory 714 may be a movement trajectory in bad weather conditions such as rainy weather. As shown, when the surrounding vehicle 720 is a vehicle in the rear side of the own vehicle 710, the vehicle system may generate the second movement trajectory 714 by increasing the longitudinal speed and decreasing the lateral speed of the own vehicle 710.

With this configuration, the movement trajectory of the vehicle is regenerated according to the collision risk, and regardless of road conditions such as bad weather, safe driving and lane change may be performed by ADAS and/or autonomous driving without interfering with the traffic flow of the own vehicle 710 and surrounding vehicle 720.

Figure 8:
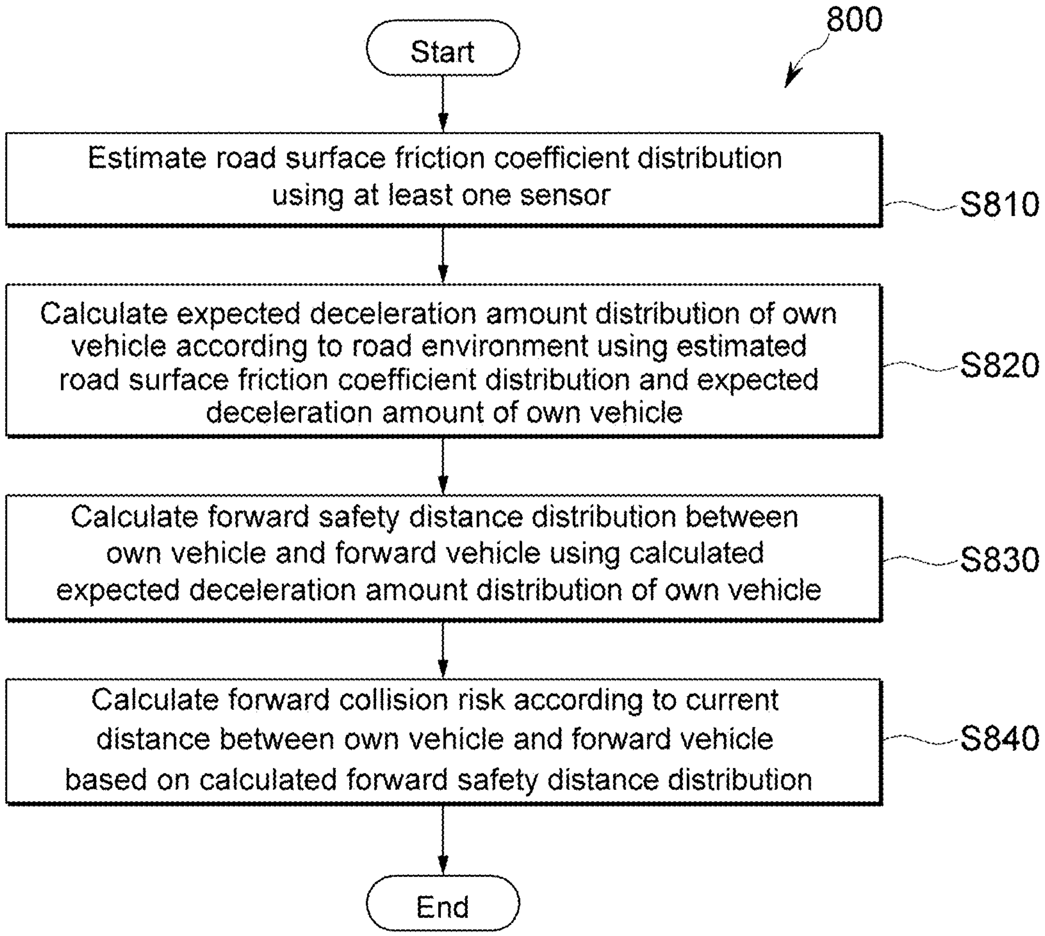
FIG. 8 is a diagram illustrating an example of a collision risk estimation method according to a road environment according to an example embodiment of the present disclosure.

FIG. 8 is a diagram illustrating an example of a collision risk estimation method 800 according to a road environment according to an example embodiment of the present disclosure. The collision risk estimation method 800 according to the road environment may be performed by at least one processor (e.g., at least one processor of a vehicle system and/or an electronic control device). The collision risk estimation method 800 according to the road environment may be initiated by a processor estimating a road surface friction coefficient distribution using at least one sensor S810.

The processor may calculate the expected deceleration amount distribution of the own vehicle according to the road environment using the estimated road surface friction coefficient distribution and the expected deceleration amount of the own vehicle S820. Here, the expected deceleration amount of the own vehicle may indicate a deceleration amount according to the vehicle type of the own vehicle. For example, the processor may calculate the expected deceleration amount distribution of the own vehicle by multiplying the estimated road surface friction coefficient distribution with the expected deceleration amount of the own vehicle.

The processor may calculate the forward safety distance distribution between the own vehicle and the forward vehicle using the calculated expected deceleration amount distribution of the own vehicle S830. For example, the processor may calculate the expected deceleration distance distribution of the own vehicle using the expected deceleration amount distribution of the own vehicle, and calculate the forward safety distance distribution using the driving distance of the own vehicle during the reaction time, the expected deceleration distance distribution of the own vehicle, and the deceleration distance of the forward vehicle.

Then, the processor may calculate the forward collision risk according to the current distance between the own vehicle and the forward vehicle based on the calculated forward safety distance distribution S840. In addition, when the calculated forward collision risk is greater than or equal to the first threshold value, the processor may regenerate the movement trajectory by reducing the driving speed of the own vehicle.

Additionally or alternatively, the processor may calculate the expected deceleration amount distribution of the rear vehicle according to the road environment using the road surface friction coefficient distribution and the expected deceleration amount of the rear vehicle, and calculate the rear safety distance distribution between the own vehicle and the rear vehicle using the calculated expected deceleration amount distribution of the rear vehicle. In addition, the processor may calculate the rear collision risk according to the current distance between the own vehicle and the rear vehicle based on the calculated rear safety distance distribution.

Additionally, the processor may determine the viewing range of the rear vehicle using at least one sensor, and calculate the reaction time distribution of the rear vehicle corresponding to the determined viewing range. Then, the processor may calculate the rear safety distance distribution between the own vehicle and the rear vehicle using the expected deceleration amount distribution of the rear vehicle and the reaction time distribution of the rear vehicle. For example, the processor may calculate the expected deceleration distance distribution of the rear vehicle using the expected deceleration amount distribution of the rear vehicle, and may calculate the driving distance of the rear vehicle during the reaction time using the reaction time distribution of the rear vehicle. In this case, the processor may calculate the rear safety distance distribution using the driving distance of the rear vehicle during the reaction time, the expected deceleration distance distribution of the rear vehicle, and the deceleration distance of the own vehicle.

When the calculated rear collision risk is greater than or equal to the second threshold value, the processor may regenerate the movement trajectory by increasing the driving speed of the own vehicle. Additionally, the processor may transfer the control authority of the own vehicle to the driver of the own vehicle when the forward collision risk is greater than or equal to the first threshold value and the rear collision risk is greater than or equal to the second threshold value. In other words, when it is determined that autonomous driving and/or ADAS control is no longer possible, the processor may provide an autonomous driving failure notification to the driver and transfer the control right so that the driver manually controls the vehicle.

The above-described methods and/or various example embodiments may be realized with digital electronic circuits, computer hardware, firmware, software, and/or combinations thereof. Various example embodiments of the present disclosure may be executed by a data processing device, e.g., one or more programmable processors and/or one or more computing devices, or be implemented as a non-transitory computer readable recording medium and/or a computer program stored on a computer readable recording medium. The above-described computer programs may be written in any type of programming language, including compiled or interpreted languages, and may be distributed in any form, such as a stand-alone program, module, or subroutine. A computer program may be distributed over one computing device, multiple computing devices connected through the same network, and/or distributed over multiple computing devices connected through multiple different networks.

The above-described methods and/or various example embodiments may be performed by one or more processors configured to execute one or more computer programs that process, store, and/or manage any function, or the like, by operating on input data or generating output data. For example, the method and/or various example embodiments of the present disclosure may be performed by a special purpose logic circuit such as a field programmable gate array (FPGA) or an application specific integrated circuit (ASIC), and devices and/or systems for performing the methods and/or example embodiments of the present disclosure may be implemented as special purpose logic circuits such as FPGAs or ASICs.

The one or more processors executing the computer program may include a general purpose or special purpose microprocessor and/or one or more processors of any kind of digital computing device. The processor may receive instructions and/or data from each of the read-only memory and the random access memory, or receive instructions and/or data from the read-only memory and the random access memory. In the present disclosure, components of a computing device performing methods and/or example embodiments may include one or more processors for executing instructions, and one or more memory devices for storing instructions and/or data.

According to an example embodiment, a computing device may exchange data with one or more mass storage devices for storing data. For example, the computing device may receive data from a magnetic disc or optical disc and/or transfer data to a magnetic disk or optical disk. A computer readable storage medium suitable for storing instructions and/or data associated with a computer program includes may include, but is not limited to, any type of non-volatile memory including semiconductor memory devices such as erasable programmable read-only memory (EPROM), electrically erasable PROM (EEPROM), and flash memory devices. For example, computer readable storage media may include magnetic disks such as internal hard disks or removable disks, magneto-optical disks, CD-ROM and DVD-ROM disks.

In order to provide interaction with the user, the computing device (e.g., cathode ray tube (CRT), liquid crystal display (LCD), etc.) may include, but is not limited to, a display device for providing or displaying information to a user and a pointing device (e.g., keyboard, mouse, trackball, etc.) for allowing a user to provide input and/or commands, etc., on the computing device. In other words, the computing device may further include any other type of device for providing interaction with a user. For example, the computing device may provide any form of sensory feedback to the user for interaction with the user, including visual feedback, auditory feedback, and/or tactile feedback. In this regard, the user may provide input to the computing device through various gestures such as visual, voice, and motion.

In the present disclosure, various example embodiments may be implemented in a computing system including a back-end component (e.g., a data server), a middleware component (e.g., an application server), and/or a front-end component. In this case, the components may be interconnected by any form or medium of digital data communication, such as a communication network. For example, the communication network may include a local area network (LAN), a wide area network (WAN), and the like.

The computing device based on the example example embodiments described herein may be implemented using hardware and/or software configured to interact with a user, including a user device, user interface (UI) device, user terminal, or client device. For example, the computing device may include a portable computing device such as a laptop computer. Additionally or alternatively, the computing device may include, but is not limited to, personal digital assistants (PDAs), tablet PCs, game consoles, wearable devices, internet of things (IoT) devices, virtual reality (VR) devices, augmented reality (AR) devices, and the like. The computing device may further include other types of devices configured to interact with the user. Further, the computing device may include a portable communication device (e.g., a mobile phone, smart phone, wireless cellular phone, etc.) suitable for wireless communication over a network, such as a mobile communication network. The computing device may be configured to wirelessly communicate with a network server using wireless communication technologies and/or protocols, such as radio frequency (RF), microwave frequency (MWF), and/or infrared ray frequency (IRF).

Various example embodiments including specific structural and functional details in the present disclosure are exemplary. Accordingly, example embodiments of the present disclosure are not limited to those described above and may be implemented in various different forms. In addition, the terms used in the present disclosure are for describing some example embodiments and are not construed as limiting the example embodiments. For example, words in the singular form and above may be interpreted to include the plural form as well, unless the context clearly dictates otherwise.

In the present disclosure, unless defined otherwise, all terms used in this specification, including technical or scientific terms, have the same meaning as commonly understood by a person of ordinary skill in the art to which such concept belongs. In addition, terms commonly used, such as terms defined in a dictionary, should be interpreted as having a meaning consistent with the meaning in the context of the related art.

Although the present disclosure has been described in relation to some example embodiments in this specification, various modifications and alterations can be made without departing from the scope of the present disclosure that can be understood by those skilled in the art. In addition, such modifications and alterations are intended to fall within the scope of the claims appended hereto.

What is claimed is:

1. A method for estimating a collision risk according to a road environment performed by at least one processor, the method comprising:

collecting sensing information using at least one sensor;

estimating a probability distribution of a road surface friction coefficient based on the collected sensing information;

calculating a probability distribution of an expected deceleration amount of an own vehicle according to the road environment using the estimated probability distribution of the road surface friction coefficient and an expected deceleration amount of the own vehicle;

calculating a probability distribution of a forward safety distance between the own vehicle and a forward vehicle using the calculated probability distribution of the expected deceleration amount of the own vehicle;

calculating a forward collision risk according to a current distance between the own vehicle and the forward vehicle based on the calculated probability distribution of the forward safety distance;

calculating a probability distribution of an expected deceleration amount of a rear vehicle according to the road environment using the estimated probability distribution of the road surface friction coefficient and an expected deceleration amount of the rear vehicle;

calculating a probability distribution of a rear safety distance between the own vehicle and the rear vehicle using the calculated probability distribution of the expected deceleration amount of the rear vehicle;

calculating a rear collision risk according to a current distance between the own vehicle and the rear vehicle based on the calculated probability distribution of the rear safety distance; and when the forward collision risk is greater than or equal to a first threshold and the rear collision risk is greater than or equal to a second threshold, transferring control authority of the own vehicle to a driver of the own vehicle.

2. The method of claim 1, wherein the at least one sensor comprises a first sensor and a second sensor, and the estimating of the probability distribution of the road surface friction coefficient using the at least one sensor comprises estimating a probability distribution of a first road surface friction coefficient based on the first sensor and estimating a probability distribution of a second road surface friction coefficient based on the second sensor.

3. The method of claim 2, wherein the calculating of the probability distribution of the expected deceleration amount of the own vehicle according to the road environment using the estimated probability distribution of the road surface friction coefficient and the expected deceleration amount of the own vehicle comprises:

calculating a probability distribution of a first expected deceleration amount according to the probability distribution of the first road surface friction coefficient, and calculating a probability distribution of a second expected deceleration amount according to the probability distribution of the second road surface friction coefficient, and calculating the probability distribution of the expected deceleration amount of the own vehicle by combining the probability distribution of the first expected deceleration amount and the probability distribution of the second expected deceleration amount based on reliability of the first sensor and the second sensor.

4. The method of claim 1, wherein the calculating of the probability distribution of the forward safety distance between the own vehicle and the forward vehicle using the calculated probability distribution of the expected deceleration amount of the own vehicle comprises:

calculating a probability distribution of an expected deceleration distance of the own vehicle based on the calculated probability distribution of the expected deceleration amount of the own vehicle; and calculating the probability distribution of the forward safety distance using a driving distance of the own vehicle during a reaction time, the probability distribution of the expected deceleration distance of the own vehicle, and a deceleration distance of the forward vehicle, wherein the expected deceleration distance is a distance that the own vehicle travels from a moment braking is applied after the reaction time until the own vehicle stops.

5. The method of claim 1, further comprising:

when the calculated forward collision risk is greater than or equal to a first threshold value, regenerating a movement trajectory by reducing a driving speed of the own vehicle.

6. The method of claim 1, further comprising:

determining a viewing range of the rear vehicle using the at least one sensor; and calculating a probability distribution of a reaction time of the rear vehicle corresponding to the determined viewing range.

7. The method of claim 6, wherein the calculating of the probability distribution of the rear safety distance between the own vehicle and the rear vehicle using the calculated probability distribution of the expected deceleration amount of the rear vehicle comprises:

calculating the probability distribution of the rear safety distance between the own vehicle and the rear vehicle using the probability distribution of the expected deceleration amount of the rear vehicle and the probability distribution of the reaction time of the rear vehicle.

8. The method of claim 7, wherein the calculating of the probability distribution of the rear safety distance between the own vehicle and the rear vehicle using the probability distribution of the expected deceleration amount of the rear vehicle and the probability distribution of the reaction time of the rear vehicle comprises:

calculating a probability distribution of an expected deceleration distance of the rear vehicle based on the calculated probability distribution of the expected deceleration amount of the rear vehicle;

calculating a driving distance of the rear vehicle during a reaction time using the probability distribution of the reaction time of the rear vehicle; and calculating the probability distribution of the rear safety distance using the driving distance of the rear vehicle during the reaction time, the probability distribution of the expected deceleration distance of the rear vehicle, and a deceleration distance of the own vehicle, wherein the expected deceleration distance is a distance that the own vehicle travels from a moment braking is applied after the reaction time until the own vehicle stops.

9. The method of claim 1, further comprising:

when the calculated rear collision risk is greater than or equal to a second threshold value, regenerating a movement trajectory by increasing a driving speed of the own vehicle.

10. A method for estimating a collision risk according to a road environment performed by at least one processor, the method comprising:

collecting sensing information using at least one sensor;

estimating a probability distribution of a road surface friction coefficient based on the collected sensing information;

calculating a probability distribution of an expected deceleration amount of a rear vehicle according to the road environment using the estimated probability distribution of the road surface friction coefficient and an expected deceleration amount of the rear vehicle;

calculating a probability distribution of a rear safety distance between an own vehicle and the rear vehicle using the calculated probability distribution of the expected deceleration amount of the rear vehicle;

calculating a rear collision risk according to a current distance between the own vehicle and the rear vehicle based on the calculated probability distribution of the rear safety distance; and when the calculated rear collision risk is greater than or equal to a second threshold value, regenerating a movement trajectory by increasing a driving speed of the own vehicle.

11. The method of claim 10, further comprising:

determining a viewing range of the rear vehicle using the at least one sensor; and calculating a probability distribution of a reaction time of the rear vehicle corresponding to the determined viewing range.

12. The method of claim 11, wherein the calculating of the probability distribution of the rear safety distance between the own vehicle and the rear vehicle using the calculated probability distribution of the expected deceleration amount of the rear vehicle comprises calculating the probability distribution of the rear safety distance between the own vehicle and the rear vehicle using the probability distribution of the expected deceleration amount of the rear vehicle and the probability distribution of the reaction time of the rear vehicle.

13. The method of claim 12, wherein the calculating of the probability distribution of the rear safety distance between the own vehicle and the rear vehicle using the probability distribution of the expected deceleration amount of the rear vehicle and the probability distribution of the reaction time of the rear vehicle comprises:

calculating a probability distribution of an expected deceleration distance of the rear vehicle based on the calculated probability distribution of the expected deceleration amount of the rear vehicle;

calculating a driving distance of the rear vehicle during a reaction time using the probability distribution of the reaction time of the rear vehicle; and calculating the probability distribution of the rear safety distance using the driving distance of the rear vehicle during the reaction time, the probability distribution of the expected deceleration distance of the rear vehicle, and a deceleration distance of the own vehicle, wherein the expected deceleration distance is a distance that the own vehicle travels from a moment braking is applied after the reaction time until the own vehicle stops.

14. A vehicle system comprising:

at least one sensor configured to collect sensing information for determining at least a part of a road surface friction coefficient and a viewing range according to a road environment;

an electronic control device configured to calculate at least a part of a probability distribution of a forward safety distance between an own vehicle and a forward vehicle and a probability distribution of a rear safety distance between the own vehicle and a rear vehicle based on the sensing information obtained from the at least one sensor; and a driving unit configured to, when a movement trajectory of the own vehicle is generated by the electronic control device, drive the vehicle based on the generated movement trajectory, wherein the electronic control device is configured to:

calculate a forward collision risk according to a current distance between the own vehicle and the forward vehicle based on the probability distribution of the forward safety distance;

calculate a rear collision risk according to a current distance between the own vehicle and the rear vehicle based on the probability distribution of the rear safety distance; and when the forward collision risk is greater than or equal to a first threshold and the rear collision risk is greater than or equal to a second threshold, transfer control authority of the own vehicle to a driver of the own vehicle.

15. The vehicle system of claim 14, wherein the electronic control device is configured to:

estimate a probability distribution of a road surface friction coefficient based on the sensing information;

calculate a probability distribution of an expected deceleration amount of the own vehicle according to the road environment using the probability distribution of the estimated road surface friction coefficient and an expected deceleration amount of the own vehicle; and calculate the probability distribution of the forward safety distance between the own vehicle and the forward vehicle using the calculated probability distribution of the expected deceleration amount of the own vehicle.

16. The vehicle system of claim 14, wherein the electronic control device is configured to, when the calculated forward collision risk is greater than or equal to a first threshold value, regenerate the movement trajectory by reducing a driving speed of the own vehicle.

* * * * *